Patented Aug. 14, 1945

2,382,682

UNITED STATES PATENT OFFICE 2,382,682

FOOD PRODUCT

Edward Van Dellen and Richard N. Ball, Visalia, Calif.

No Drawing. Application July 28, 1942, Serial No. 452,612

7 Claims. (Cl. 99—100)

This invention relates to food products, and particularly to a method of forming said product.

At the present time, pimiento is employed for various purposes, among which is its use as a stuffing for olives. The pimiento fruit, however, is expensive, is irregular in shape, and is difficult to cut efficiently. Where pimiento is used as the stuffing material for olives, the pimiento is cut into a strip of approximately 1½ inches in length and ¼ inch in width. After the olive has been pitted, the pimiento strip is folded, with the two ends inserted into the opening of the olive, until the folded surface appears flush with the end of the olive. This requires hand labor and considerable time, as well as experience, to do efficiently and still present a pleasing appearance in the olive so stuffed.

We have discovered a method of processing material whereby all the characteristics of pimiento material have been retained, which includes flavor equal to real pimiento material, and which substitute material may be made into cylinders and stuffed into the olive with automatic machinery, the material in its finished form costing 2¢ to 4¢ per pound. Genuine pimiento sells from 12¢ to 18¢ per pound and approximately 15% is wasted in cutting, and when used for the stuffing of olives, the olives are never uniform in appearance. With our method, the appearance of the olive is always uniform.

The substitute pimiento material may be used for any purpose where pimiento is generally employed.

In the practice of our method, we may take fresh material, which is characterized in that the tissue is firm without pronounced characteristic flavor of its own. As such a material we cite pumpkin, squash, or zucca melon. Melons of this character are inexpensive and large pieces of tissue may be obtained therefrom. We may also use other fruits, such as the Jerusalem artichoke which, in the raw state, has a raw potato flavor but when processed in accordance with our method, loses this particular flavor and will assume the flavor desired.

While we prefer to use fresh material, nevertheless we may use with equal ease, salt stock material or material preserved in sulfur dioxide and lime. By way of example, after removing the hard outer skin of fresh material, such as pumpkin, squash or zucca melon, the seeds and loose fibrous material are removed and the tissue cut into sections. If the material being used is of the salt stock type, said material is soaked in water for the purpose of removing the brine or other preservative. From the cut sections are formed cylinders, such as by cutting said sections with a cylinder coring tool, the cylinders being substantially the same diameter as the hole in the olive after pitting.

To color the material, the tissue of the cylinders is dyed. We have found that erythrosine dye imparts a color similar to pimiento, although other dyes may be used, such as tartrozine and ponceau red. Assuming the use of erythrosine dye, we prepare a solution thereof of .06% dye in 4% brine. The cylinders are placed in this dye solution and allowed to remain for at least 24 hours with frequent stirring. Temperatures are not critical and the desired color can be ascertained by inspection of the cylinders. Thereafter, the dye solution in brine is drained and the color is set in the cylinders by the use of an acidified 7% brine. This acidification is through the medium of either lactic or phosphoric acid to a pH 2.0. If after the fixing of the color, a more intense color is desired, the material may be re-dyed and refixed and as many times as may be necessary or desirable.

For the purpose of imparting flavor to the cylinders and assuming that a pimiento flavor is desired, the pimiento material is ground from scraps, whole pimiento pods, either peeled or unpeeled, cored or with cores, fresh or from a brine solution or brine from salt cured or preserved pimientos. This material is added to a salt brine solution containing the dyed cylinders. The pimiento material remains in contact with the cylinders until the desired flavor has been imparted, which usually requires from 2 to 10 days of time, during which period the mass should be thoroughly stirred to secure even flavoring.

Thereafter, the cylinders may be separated from the pimiento material by washing, and the cylinders are ready for use. These cylinders may be stuffed in olives by automatic machinery, with a resulting saving in expense, both as to labor and cheapness of material.

While we have not mentioned the character of the vats used during the processing, we will mention that oak barrels or redwood vats are desirable.

We claim:

1. The method of forming a substitute food product, capable of impregnation in a brine solution which consists in first selecting a melon food product of the class consisting of pumpkin, squash and zucca melon without pronounced characteristic flavor of its own and which resembles the tissue structure of an original natural food product, then placing said substitute food product in a brine solution containing ground tissue of the natural food product, to thereby impregnate the substitute food product with the flavor of the ground food product.

2. The method of forming a substitute food product for pimiento material, which consists in first selecting a fruit tissue characterized in that it is firm in texture and without pronounced characteristic flavor of its own, cutting the tissue to size, dyeing and fixing the color in the tissue to match the color of natural pimiento, then placing said dyed tissue in a brine solution containing natural pimiento material.

3. The method of forming a substitute food product for pimiento material, which consists in first selecting a fruit tissue characterized in that it is firm in texture and without pronounced characteristic flavor of its own, cutting the tissue to size, dyeing and fixing the color in the tissue to match the color of natural pimiento, then placing said dyed tissue in a brine solution containing ground natural pimiento material.

4. The method of forming a food product simulating pimiento, which consists in first selecting a fruit tissue characterized in that it is firm in texture and without pronounced characteristic flavor of its own, cutting the tissue to size, placing said tissue in a brine solution containing dye to color the tissue, fixing the color, then placing said dyed material in a salt brine solution containing ground pimiento material.

5. The method of forming a food product simulating pimiento, which consists in cutting melon tissue, such as pumpkin, squash, or zucca, into sections, dyeing said sections to pimiento color, fixing said dye in an acidified brine, then placing said colored sections in a brine solution containing ground pimiento material.

6. The method of forming a substitute food product for pimiento stuffing for olives, which consists in first selecting a fruit tissue which is firm in texture and without pronounced characteristic flavor, cutting said tissue into cylinders to fit the opening in an olive after pitting, placing said cylinders in a brine solution containing erythrosine dye, fixing the color by placing said cylinders in an acidified brine solution, and thereafter placing said cylinders in a solution containing a powdered pimiento material and allowing said cylinders to remain in contact with said pimiento material until the desired flavor has been imparted thereto.

7. The method of forming a substitute food product for pimiento stuffing for olives, which consists in taking a melon, such as pumpkin, squash, or zucca, and cutting the tissue into sections, forming cylinders of a size sufficient to fit within said olives when the olives have been pitted, dyeing said cylinders the color of pimiento by placing said cylinders in a solution containing 6% erythrosine dye and 4% brine, allowing said cylinders to remain in said dye solution until colored, setting the color in said cylinders by placing said cylnders in an acidified 7% brine solution of a pH of 2, removing said cylinders from said solution, and placing said cylinders in a brine solution containing ground pimiento material and allowing said cylinders to remain in contact with said pimiento material until the desired pimiento flavor has been imparted to the said cylinders.

EDWARD VAN DELLEN.
RICHARD N. BALL.